US009118922B2

(12) United States Patent
Abadir

(10) Patent No.: US 9,118,922 B2
(45) Date of Patent: Aug. 25, 2015

(54) PROGRESSIVE ENCODING OF VIDEO CONTENT WITHIN A SWARM ENVIRONMENT

(75) Inventor: Essam Ernest Abadir, Lancaster, PA (US)

(73) Assignee: TMM Inc., Wilmington, DE (US)

( * ) Notice: Subject to any disclaimer, the term of this patent is extended or adjusted under 35 U.S.C. 154(b) by 248 days.

(21) Appl. No.: 12/979,577

(22) Filed: Dec. 28, 2010

(65) Prior Publication Data

US 2011/0158311 A1    Jun. 30, 2011

Related U.S. Application Data

(60) Provisional application No. 61/291,305, filed on Dec. 30, 2009.

(51) Int. Cl.
*H04N 7/24* (2011.01)
*H04N 19/436* (2014.01)
*H04N 21/4788* (2011.01)

(52) U.S. Cl.
CPC ......... *H04N 19/436* (2014.11); *H04N 21/4788* (2013.01)

(58) Field of Classification Search
CPC ....................................................... H04N 7/26
USPC .................................................. 375/240.01
See application file for complete search history.

(56) References Cited

U.S. PATENT DOCUMENTS

| 5,065,447 | A | 11/1991 | Barnsley et al. | |
|---|---|---|---|---|
| 6,002,794 | A | 12/1999 | Bonneau et al. | |
| 8,462,850 | B2 * | 6/2013 | Mohan et al. | 375/240.16 |
| 2002/0110194 | A1 * | 8/2002 | Bottreau | 375/240.16 |
| 2005/0080916 | A1 * | 4/2005 | Katayama | 709/232 |
| 2005/0175085 | A1 * | 8/2005 | Bergen et al. | 375/240.01 |
| 2005/0226317 | A1 * | 10/2005 | Bottreau | 375/240.01 |
| 2006/0002473 | A1 * | 1/2006 | Mohan et al. | 375/240.16 |
| 2006/0039464 | A1 * | 2/2006 | Emerson et al. | 375/240.01 |
| 2007/0280253 | A1 | 12/2007 | Rooholamini et al. | |
| 2009/0288127 | A1 * | 11/2009 | Corson et al. | 725/110 |

OTHER PUBLICATIONS

Office Action dated Aug. 29, 2013, issued in U.S. Appl. No. 12/972,732.

* cited by examiner

*Primary Examiner* — Dave Czekaj
*Assistant Examiner* — Kehinde O Abimbola
(74) *Attorney, Agent, or Firm* — Merchant & Gould, P.C.

(57) ABSTRACT

Embodiments are directed towards employing distributed computing concepts such as peer-to-peer processing to distribute across a plurality of peer client devices, or swarm, the computations of High Cost and Compression Encoding Schemes (HCC) for encoding digital video content. As more peer client devices receive the content, progressively more iterations of a HCC encoding is performed on various frames within the video content, thereby improving the encoding of the overall video content. Optionally, such distributed progressive processing or swarming approach may include other encoding, such as scaling corrections, scene transitions corrections, and the like.

9 Claims, 5 Drawing Sheets

PROGRESSIVE ENCODING OF VIDEO CONTENT WITHIN A SWARM ENVIRONMENT

CROSS-REFERENCE TO RELATED APPLICATION

This application claims the benefit of priority to U.S. Provisional Patent Application No. 61/291,305, filed Dec. 30, 2009, which is hereby incorporated by reference in its entirety.

TECHNICAL FIELD

The present invention relates generally to digital image processing, and, more particularly, but not exclusively to employing progressive encoding of digital content using a distributed or swarming environment.

BACKGROUND

According to some studies, the volume of information over a network, such as the Internet, is expected to more than triple over the next three years. Data is likely to remain the largest percentage of Internet traffic, with a large percentage of this information being digital video content and/or audio content. Often, the issues of concern with Internet traffic range from business to consumer response and order times, to the time required to deliver business information to a traveler using a wireless device, to the download time for rich media such as music, videos, and so forth. Thus, not surprisingly, a major complaint among Internet users is a lack of speed. Additionally, users' complaints often center on how long it takes to access and display content, such as video content, on their computing device. This may especially be true where the computing device involves wireless computing devices such that the content is transmitted over slower transmission rates. One solution, therefore, may be to send less data. This is where compression may help.

Briefly, compression of the data is typically directed towards finding and reducing an amount of redundancy within the content, in order to be able to transmit the data in a more efficient form. For digital video content, compression then involves decreasing a number of bits used to represent an image in such a way that either an exact replica of the image or an approximate replica of the image is generated. The reduced image may then be transferred over a network and/or even stored more efficiently than the original image having more bits. When the content is to be played, such as being rendered to a video display screen, the compressed content may then be uncompressed.

One such set of compression mechanisms in wide use today are known as MPEG—from the Moving Picture Experts Group (MPEG). Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available through the International Organization for Standardization or Organisation internationale de normalization, which is widely known as ISO), which is hereby incorporated by reference. Other standards from MPEG have also been generated, including, MPEG-4 for audio-visual objects.

MPEG-2 employs content streams, which may include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames may include intra-frames (I-frames), forward predicted frames (P-frames), and/or bi-directional predicted frames (B-frames).

While MPEG has been in wide use for video compression or encoding, such algorithms have often still been considered too inefficient, costly, and/or slow for the amount and/or type of digital video content that users often demand access to over the Internet. Many video encoding codecs exist, some of which use more sophisticated, complex algorithms to encode an image sequence using fewer bits than MPEG-2. For example, MPEG-2 has been followed by MPEG-4 and then, more recently, by H.264. However, use of such compression or encoding algorithms may still use considerable computing resources. Therefore, it is respect to these and other considerations that the following is provided.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
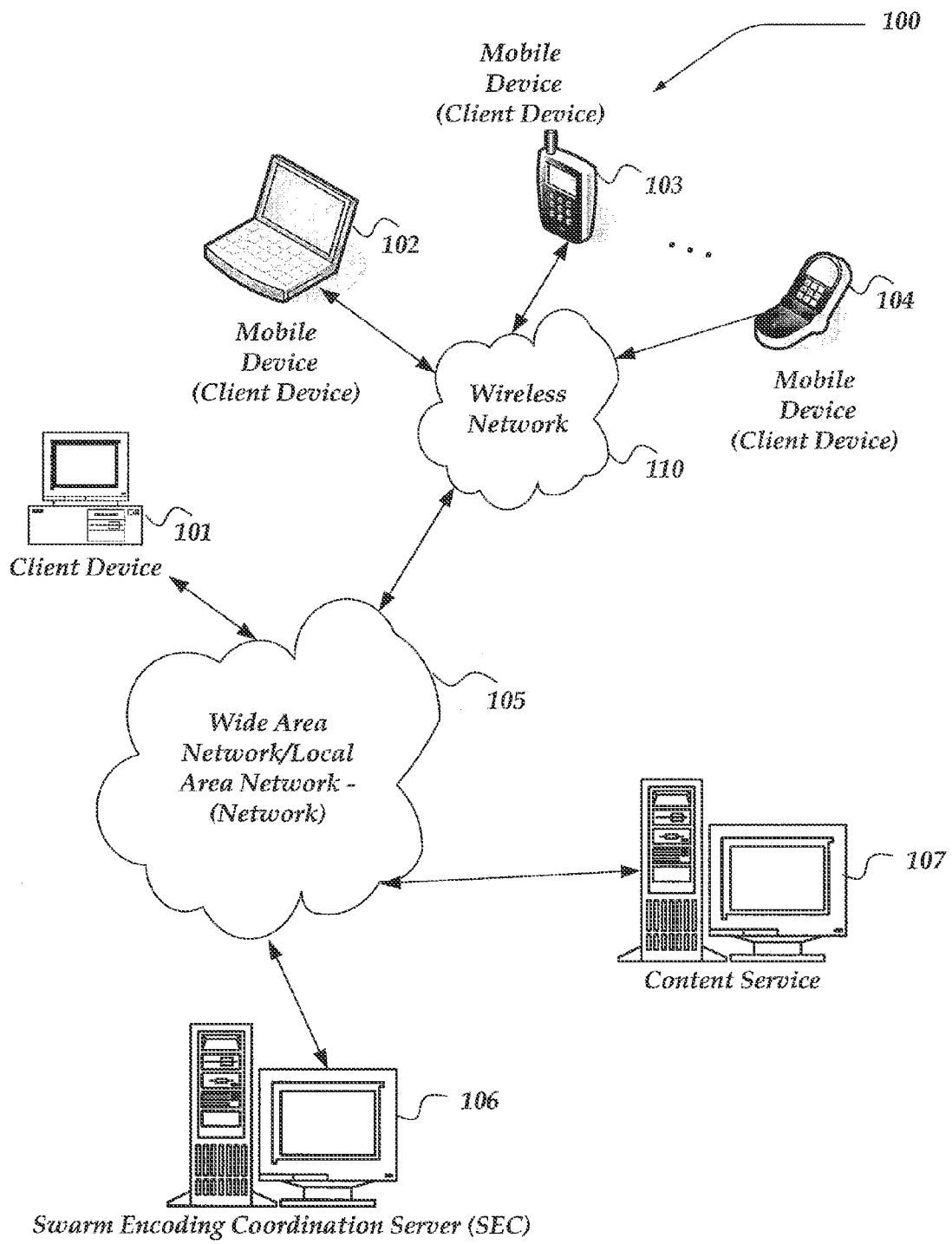
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "High Cost and Compression Encoding Scheme" (HCC) refers to encoding schemes that require substantially more CPU cycles to encode a video sequence but that achieve a better compression ratio for the video sequence as compared to a baseline compression scheme, such as MPEG-2, or the like, as defined below. Examples of HCC encoding schemes include, but are not limited to H.264, wavelet based codecs such as Dirac, Motion Compensated Temporal Filtering, and Snow, and the like. The cost and compression value of an encoding scheme may be determined, in one embodiment, based on an amount of a computing resource, such as CPU cycles or the like, consumed over a defined threshold for a given encoding scheme over the amount of computing resource consumed by such baseline compression schemes such as MPEG-2. Such values of cost/compression are typically determined for a same computing configuration and a same video content.

As used herein, the term "Convergence" refers to approaching toward a definite value, a definite point, or toward a fixed or equilibrium state. In one embodiment, Convergence may be determined when the HCC has progressed through a number of iterations such that the next output of the iteration is determined to be visually similar to a previous output within a tolerance threshold—defined as visual similarity. Thus, in one embodiment, Convergence is said to occur based on visual similarity being achieved within a defined region or level of tolerance.

As used herein, the term "Good Enough Threshold," or "GET," refers to when Convergence is nominally achieved for a one-time attempt to encode the data using a HCC. In practice, GET may be defined as either a threshold for a number of allowable iterations before quitting the iterations, or a threshold for a "distance" between the source data and the encoded data. In one embodiment, the number of iterations may range from about 1 to about 5; however, other values may also be selected.

As used herein, the term "distance" refers to a measure of how different two sets of data are determined to be. For example, a distance may be a measure of the difference between a source image and the encoded version of that image. Further, the term "distance" refers to a metric that quantifies how different two images are from each other. Several distance measures are well known in the art, including but not limited to chamfer distances, 2D and 3D Cartesian distances, and other measures such as the Hausdorff distance.

As used herein, the term "Baseline Video Encoding," or "BVE," refers to a high-fidelity encoding of a source video performed using, in one embodiment, a relatively fast encoding (compared to a HCC based system) method. In one embodiment, BVE may employ such relatively fast encoding mechanisms such as MPEG2 or the like.

As used herein, the term "Baseline High Cost and Compression Encoding," or "BHCC," refers to a first encoding of the video using HCC methods such as H.264, or the like, with a low GET.

As used herein, the term "Progressive HCC," or "PHCC," refers to a sub-process of a swarm scheme, described in more detail below, whereby a frame encoded using an encoding scheme, such as, but not limited to, H.264 or other HCC encoding, is further subjected to more iterations at a subsequent time and/or place using a GET which is more strict than previous iterations. It will be understood that in some cases, no further improvements that exceed a threshold value might be obtained after the first iteration. This case may then be considered to represent a trivial case of a PHCC based encoding.

Figure 4:
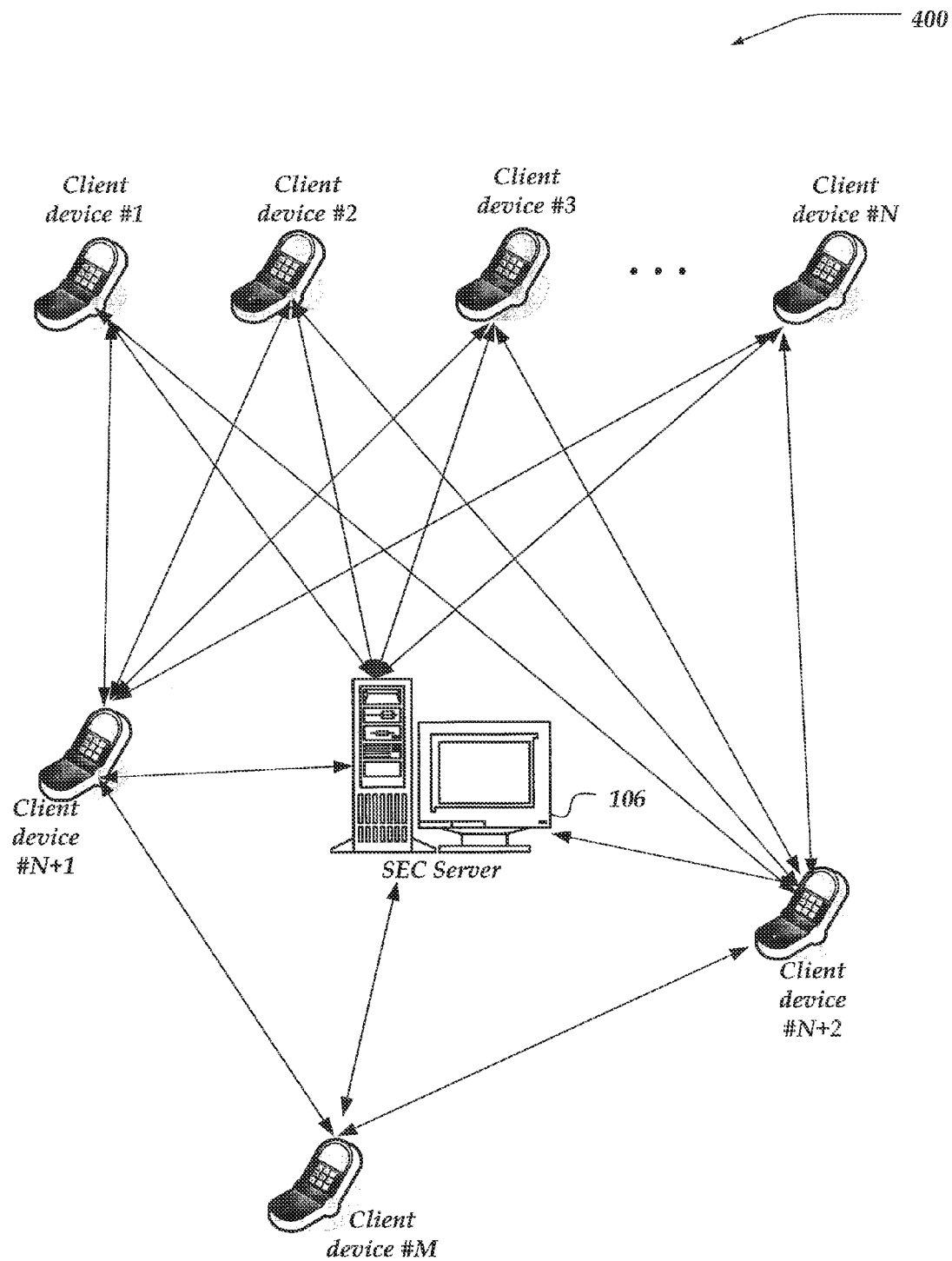
FIG. 4 illustrates another view of the system of FIG. 1 showing progressive encoding within a swarm environment.
Figure 5:
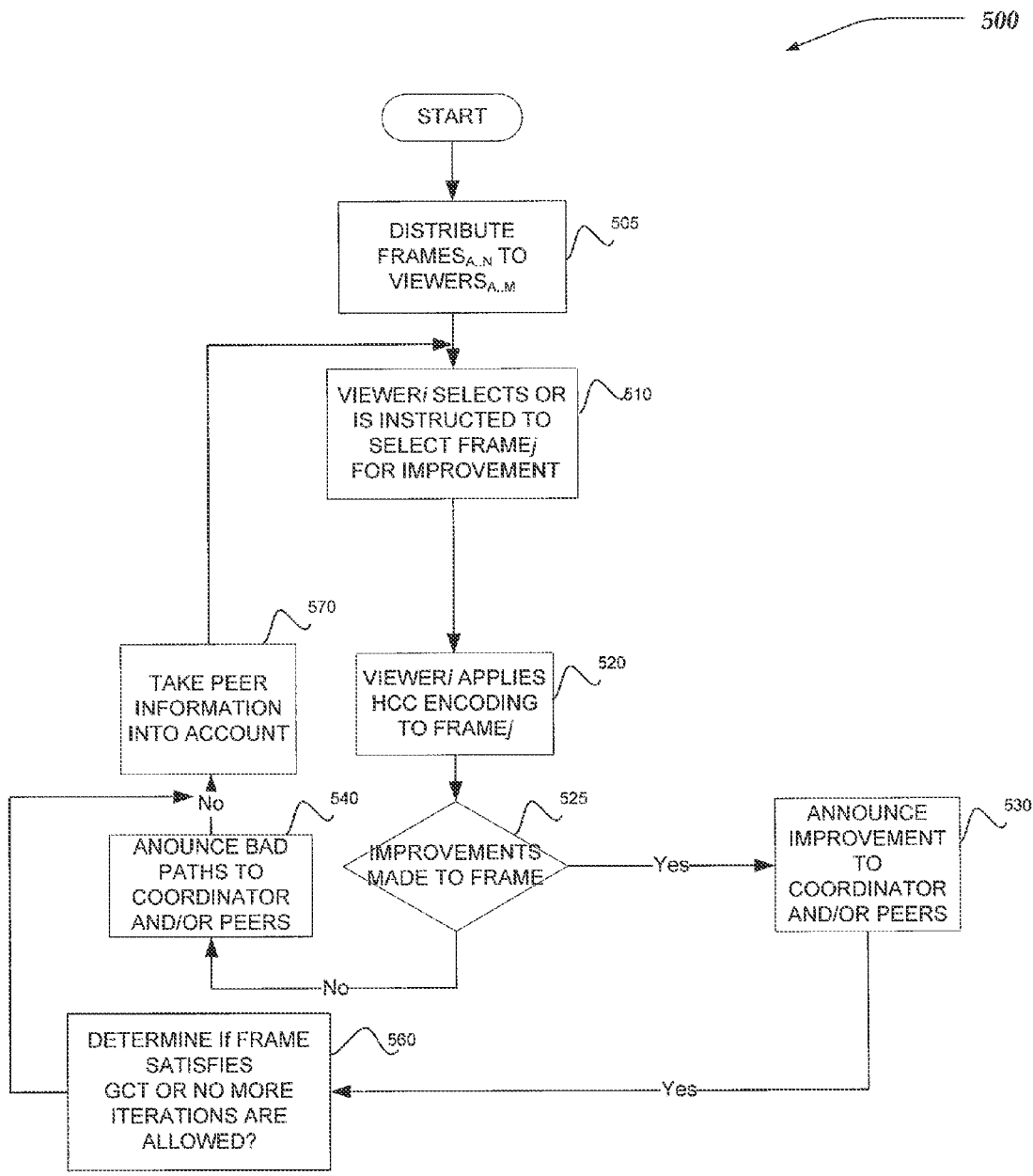
FIG. 5 illustrates a logical flow diagram generally showing one embodiment of an overview process for progressively encoding a plurality of video frames using the swarm environment.

As used herein, the term "swarm" refers to a scheme or mechanism of employing a distributed computing environment such as is described in more detail below in conjunction with FIG. 4 that enables a plurality of the peers to perform iterative encoding of various portions of video content. Thus, a "swarm environment" refers to the distributed computing environment, such as shown in FIG. 4, that enables performance of a process, such as shown in FIG. 5.

As used herein, the term "Global Convergence Threshold," or "GCT," refers to a break out point for the PHCC when the encoding is considered globally good enough. In one embodiment, GCT may be viewed as being to PHCC as GET is to HCC.

As discussed above, compression (encoding) is often used to reduce the amount of data that is to be transferred across a network, stored in a computer-readable storage medium, or the like. However, it is desirable that when a compressed/encoded video content is decompressed/decoded, a quality of the video content remains at a definable level for a viewer. Further, it is desirable to perform the decompression actions in a manner that seeks to minimize an amount of compute resources consumed, whether those compute resources be based on central processing unit (CPU) cycle time, memory resources, or some other criteria.

Based on the above, in one embodiment, selections of GET and/or GCT may be made to optimize and/or otherwise balance these considerations. That is, GET and/or GCT may be selected to balance a resultant video's visual quality with an achieved compression ratio and with the compute resources consumed during at least a decompression action. However, selections of GET/GCT may be based on emphasizing one of these over another. For example, knowledge and/or well-formed assumptions about an end user's compute resources for decompression may enable selections of GET/GCT to optimize visual quality while providing lesser weighting of compute resources consumed. Thus, based on knowledge of a desired resultant visual quality, compute resource characteristics and the like, GET and/or GCT may be selected to achieve desired goals.

As used herein, the term "I-Frame," refers to an "intra frame" within video content, where all visual data is encoded in that frame. A "P-Frame" and "B-Frame" refer to frames where the information in the frame is derived from movements in the data (motion vectors) relative to an I-Frame. Thus, a P-frame ('Predicted picture') holds only the changes in the image from a previous frame. For example, in a scene where a car moves across a stationary background, only the car's movements need to be encoded. A B-frame ('Bi-predictive picture') saves even more space by using differences between a current frame and both the preceding and following frames to specify its content.

Further, as used herein, the term "Combination Frame," refers to a frame that is partially encoded using a HCC and a "Low Cost and Complexity" (LCC) method such as MPEG2.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards employing distributed computing concepts such as peer-to-peer processing to distribute across a plurality of peer client devices, or swarm environment, the iterative computations of encoding of digital video content. As more peer client devices receive the content, progressively more iterations of a PHCC encoding may be performed on various frames within the video content, thereby potentially improving the encoding of the overall video content. Optionally, such distributed progressive processing or swarming approach may include other encoding, such as scaling corrections, scene transitions corrections, and the like.

Given the resource load of encoding, the HCC algorithms, an environment with significant amounts of content and many viewers, a tremendous economic impact may be gained by intelligently distributing the costs of encoding amongst the potential viewers and focusing available CPU cycles on the videos that are watched the most. This is the typical environment in many video watching scenarios ranging from traditional broadcasters to online video watching, for example, such as YouTube, or the like.

Thus, the swarm encoding scheme employs modified distributed computing concepts, such as a modified peer-to-peer processing to distribute across a plurality of peer client devices the iterative computations of HCC encoding. In one embodiment, the more viewers who watch a given video (or client devices receiving the video frames, including at least one client device that does not include viewing at least a portion of the received video content), the more likely the video encoding will be improved. This is achieved by having each of the peers in the plurality of peers (or client devices) incrementally attempting to improve an encoding of at least one of the frames within the video content using the PHCC encoding, such as is described below in conjunction with FIG. 5.

In one embodiment, a baseline video encoding or BVE of a source video is made at a central location, such as a content encoding service server, content server, or the like. In one embodiment, a BHCC of the same video source may also be performed using a limited number of iterations for a given frame. In one embodiment, the initial BHCC might not satisfy a defined "good enough threshold," or GET for the given frame.

One or more client devices may request and thereby receive a video content over a network, such as the Internet, or the like. In one embodiment, the client devices may receive and watch frames exclusively from the BVE, or a mixture of frames from the BVE, Combination Frames, and a BHCC. In either instance, each of the client devices may contribute to the Progressive HCC encoding of the content by performing HCC encoding on one or more frames, until a GCT is obtained for each frame in the video content.

As indicated, therefore, the collective contribution to the development of the PHCC is accomplished through the peer-to-peer (P2P) sharing using either a mediated or fully P2P approach, where information about the iterations for a given frame is shared amongst the peers. One non-limiting, non-exhaustive example of such a sharing scheme is described further below in conjunction with FIG. 4. However, other sharing schemes are also envisaged, including that which is described further below in conjunction with FIG. 5.

It is recognized that while a given client device may operate on a given frame at a time, the invention is not to be construed as being so limiting. For example, one or more client devices may also iterate on a group of frames that includes more than one frame. Thus, it should be recognized that a given client device may also iterate on a group of frames, pictures, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Swarm Encoding Coordination (SEC) server 106, client devices 101-104, and content service 107.

One embodiment of client devices 101-104 is described in more detail below in conjunction with FIG. 2. Generally, however, client devices 102-104 may include virtually any portable computing device capable of receiving and sending content over a network, such as network 105, wireless network 110, or the like. Such content may include, but is not limited to motion pictures, movies, videos, music, Video On Demand, interactive media, audios, still images, text, graphics, scripts, applications, and other forms of digital content useable by a computing device such as client devices 101-104.

Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based content, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-104 also may include at least one other client application that is configured to receive content from another computing device. The client application may include a capability to provide and receive textual content, graphical content, audio content, and the like. In one embodiment, the content may be received from content service 107. However, in another embodiment, the content may be received by SEC server 106, and/or even from another one of client devices 101-104. In one embodiment, the content is received uncompressed; however, in another embodiment, at least some of the content may be compressed using any of a variety of encoding mechanisms, including, but not limited to the HCC encoding mechanism, an MPEG encoding mechanism, and/or any combination of encoding mechanisms.

The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to SEC server 106, content service 107, or other computing devices.

Client devices 101-104 may further be configured to include a client application that enables an end-user to log into an end-user account that may be managed by another computing device, such as content service 107, SEC server 106, or the like. Such end-user account, for example, may be configured to enable the end-user to manage one or more online activities, including for example, peer-to-peer sharing activities, or the like. However, participation in such online networking activities may also be performed without logging into the end-user account.

In one embodiment, client devices 101-104 may receive over a network such as wireless network 110 and/or network 105 a downloadable application useable to perform Progressive HCC encoding of content within a swarm or P2P environment. In one embodiment, the downloadable application may employ a mediated approach for sharing of the content, such as through SEC 106. However, in another embodiment, the application may operate in a fully P2P configuration for sharing the progressively encoded content. The downloadable application may employ a process such as described below in conjunction with FIG. 5 to perform at least some of its actions.

Wireless network 110 is configured to couple client devices 102-104 and its components with network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, SEC server 106, content service 107, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of SEC server 106 is described in more detail below in conjunction with FIG. 3. Briefly, however, SEC server 106 may include any computing device capable of providing content to client devices 101-104 and/or content service 107 for use in performing Progressive HCC encoding of portions of the content within a swarm environment. Thus, in one embodiment, SEC server 106 may receive a request for content from one or more client devices 101-104, and provide the content as BVE content, a mixture of BVE content, Combination Frames and a BHCC. Each client device receiving the content may then perform Progressive HCC encoding on one or more frames. In one embodiment, as the frames are determined to satisfy the GCT, the client devices may provide that frame to SEC server 106 for further sharing with other client devices. In another embodiment, the coordination and sharing between other client devices of frames having achieved the GCT may be performed by the downloadable application on each of the client devices. In any event, as a video content is determined to fully satisfy the GCT for each frame within the video content, the results may be received and stored at SEC server 106 and/or content service 107 for subsequent access. SEC server 106 may employ a process such as described below in conjunction with FIG. 5 to perform at least some of its actions.

Devices that may operate as SEC server 106 include various network devices, including, but not limited to personal computers, desktop computers, multiprocessor systems, microprocessor-based or programmable consumer electronics, network PCs, servers, network appliances, and the like.

Content service 107 represents any of a variety of network devices to provide content and/or services accessible by client devices 101-104. Such services include, but are not limited to merchant sites, educational sites, news sites, personal sites, music sites, video sites, blog sites, vlog sites, online content service sites, and/or any of a variety of networking sites. Content services 107 are not constrained to such sites, and may provide various services, including messaging services, or the like. In fact, content service 107 may provide virtually any content and/or service over which a user of client devices 101-104 may want to access. Such content may be provided to the requesting client device as unencoded or uncompressed content, partially compressed/encoded, and/or fully encoded/compressed. In one embodiment, the content may be encoded using one or more encoding mechanisms.

Devices that may operate as content service 107 includes personal computers, desktop computers, multiprocessor systems, microprocessor-based or programmable consumer electronics, network PCs, servers, and the like.

Illustrative Client Device

Figure 2:
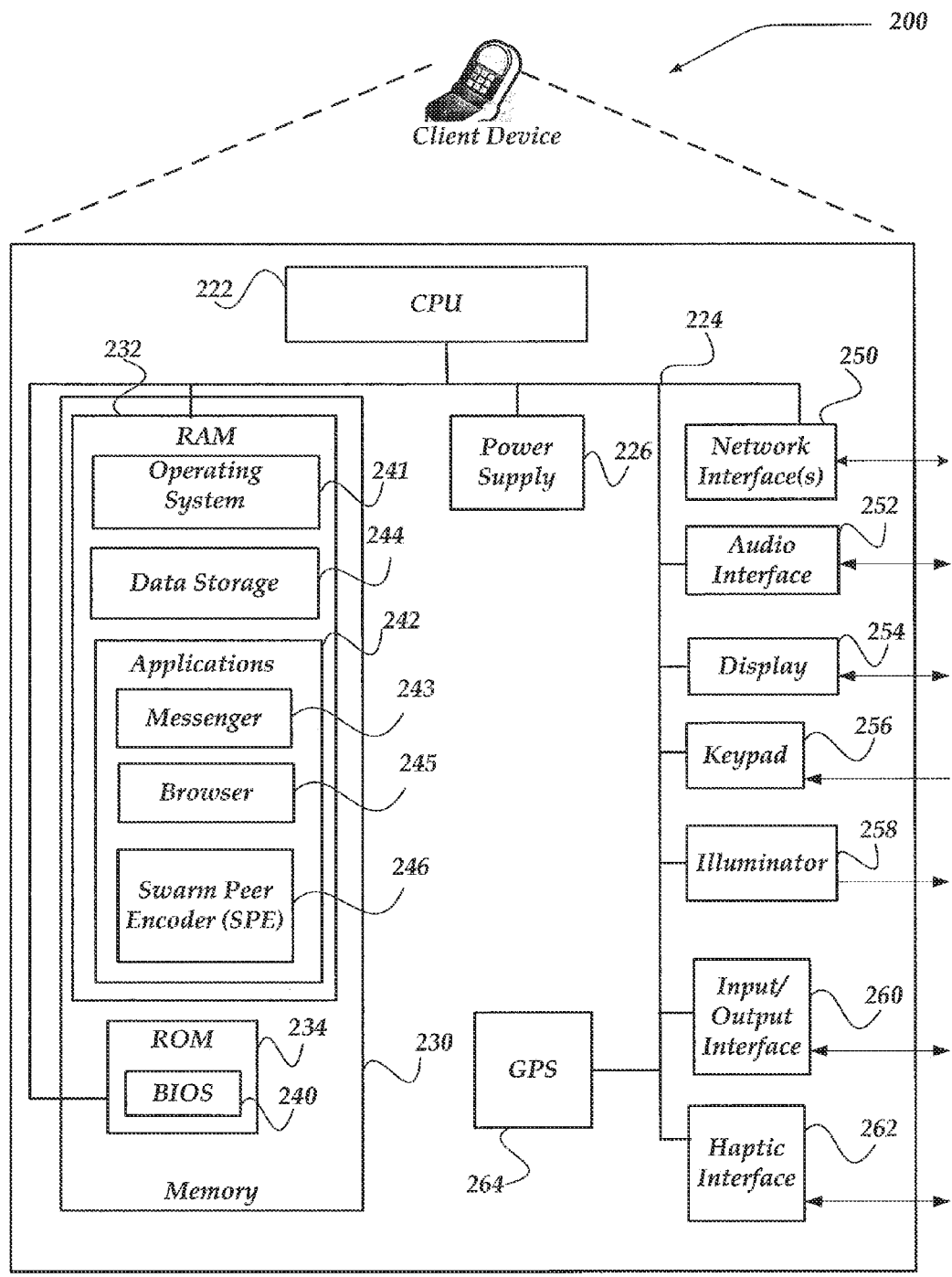
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store various content, including content that is unencoded, partially encoded, and/or fully encoded. In one embodiment, client device 200 may store portions of the content, including frames upon which client device 200 may perform Progressive HCC encoding. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and Swarm Peer Encoder (SPE) 246.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 might receive content that is encoded, and/or partially encoded. Browser 245 might then employ various decoding mechanisms, such as plug-ins, or the like, to decode portions of the content for use in playing the content on client device 200. However, the invention is not limited to using browser 245 plug-ins, or the like, for decoding the content, and other applications may be employed. For example, a stand alone multimedia player application might be employed.

Messenger 243 may be configured to manage a messaging session using any of a variety of messaging communications including, but not limited to email, Short Message Service (SMS), Instant Message (IM), Multimedia Message Service (MMS), interne relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for receiving content for use in playing at client device 200.

SPE 246 represents a downloadable application, widget, or the like, useable to perform swarm environment activities to collectively contribute to the development of a Progressive HCC encoding of video content that is directed towards satisfying the GCT for each frame within the content. SPE 246 may operate using a mediated approach or a fully P2P approach for sharing frames and content between other client devices. In one embodiment, SPE 246 might receive content from browser 245, a plug-in to browser 245, from messenger 243, or even from another peer device over the network (through another application). SPE 246 may perform at least some iteration on at least one frame, and then share the results of the iterations with another client device.

Illustrative Network Device

Figure 3:
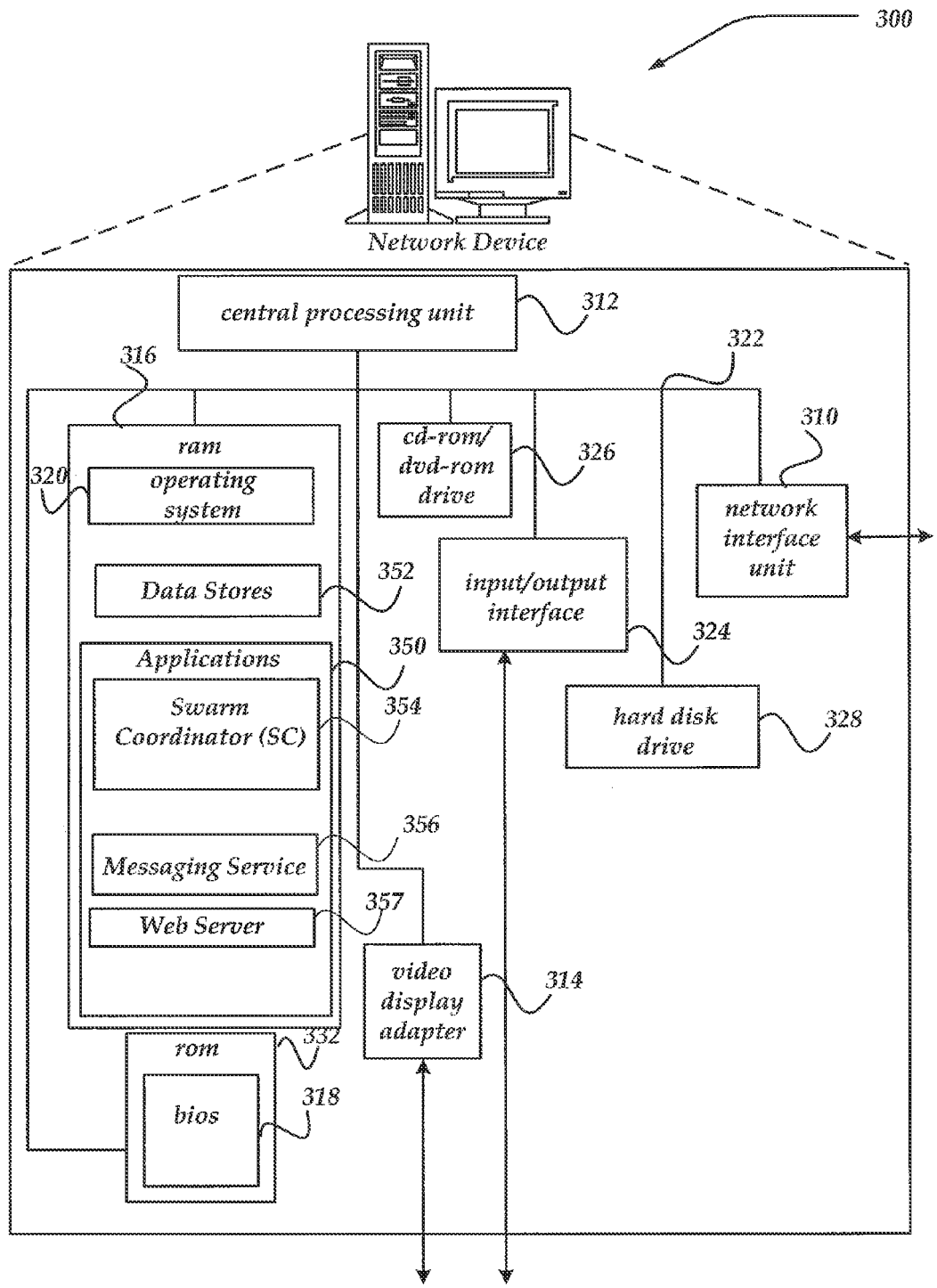
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, SEC server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 352 may include a database, text, spreadsheet, folder, file, or the like, that may be configured to maintain and store user account identifiers, user profiles, email addresses, IM addresses, and/or other network addresses; or the like. Data stores 352 may also store a Progressive HCC encoding data, including iteration information, threshold values, and other content data, based at least in part on processes described below in conjunction with FIGS. 4-5. Data stores 352 may further include program code, data, algorithms, and the like, for use by a processor, such as central processing unit (CPU) 312 to execute and perform actions. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, Swarm coordinator (SC) 354 may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like.

Web services 357 may also interact with SC 354 for use in providing a downloadable application to client devices that is useable for performing swarm encoding of content (Progressive HCC encoding within a swarm environment).

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise conduct chat sessions, VOIP sessions, or the like.

SC 354 may be employed to manage access to and coordination of the swarm encoding mechanism of Progressive HCC encoding within a swarm environment. In one embodiment, SC 354 may provide an application, widget, script, plug-in, or the like, useable to manage the Progressive HCC encoding by each of the client devices. SC 354 may operate in one embodiment to provide content over a network to one or more client devices. SC 354 may provide the content as BVE content. Optionally, SC 354 may also provide BHCC content of the same source as the BVE content that has had a limited number of iterations performed upon at least one frame therein, wherein the performed iterations might not have satisfied the GET for the at least one frame.

SC 354 may coordinate the activities performed by the various receiving client devices, and by further receiving from the client devices, frames that satisfy the GCT. As frames are received that satisfy the GCT, SC 354 may then redistribute these frames to the various client devices as replacements to the same frame in the video content that does not satisfy the GCT. In this manner, SC 354 enables each client device receiving the content to eventually receive all frames that satisfies the GCT for the content. SC 354 may employ processes such as described below in conjunction with FIG. 5 to perform at least some of its actions.

Generalized Operation

The operation of certain aspects of the invention will now be described with respect to FIGS. 4-5. FIG. 4 illustrates another view of the system of FIG. 1 showing progressive encoding within a swarm environment (one embodiment for performing the swarm encoding mechanism). It should be noted however that system 400 of FIG. 4 might include many more or less components than those shown. The components shown, however, are sufficient to disclose an illustrative embodiment for practicing the invention.

As shown, system 400 includes client devices 1-N, N+1, N+2, and M, and SEC server 106. As shown, client devices 1-N, N+1, N+2, and M represent various implementations of client devices 101-104 described above in conjunction with FIG. 1, and further in conjunction with FIG. 2. SEC server 106 is described in more detail above in conjunction with FIGS. 1 and 3.

As shown, SEC server 106 may provide content to client devices 1-N. The provided content may include a BVE source and optionally a BHCC for the same source. Client devices 1-N may then perform progressive iteration over different frames of the content. As the client devices 1-N complete their respective iterations, the results of their iterations may be provided back to SEC server 106. SEC Server 106 may then distribute the results of the iterations to client devices N+1, N+2. SEC server 106 may also provide the results of the iterations to different client devices of 1-N. Thus, for example, the iteration results of client device #1 might be redistributed by SEC server 106 to client devices 2-N. Similarly, the iteration results of client device #2 might be redistributed to client devices 1, and 3-N, and so forth. As the iterations results are received, SEC server 106 may update the encoding content with the results, and redistribute the updated encoded content among the other client devices. Alternatively, SEC server 106 might distribute just the iteration results to the other client devices, wherein the other client devices replace particular frames with the iteration results, as appropriate. In this manner, SEC server 106 may operate as a coordinator of the swarm encoding scheme. However, in another embodiment, each client device, upon initially receiving the content, manage in a fully P2P configuration the sharing of the iteration results. Thus, in one embodiment, client device M might receive iteration results from the other client devices, rather than through SEC server 106.

As described further then, in one embodiment, consider a movie M that may first be encoded into a high fidelity version, M.mp2. In one embodiment, the high fidelity version might be generated using, for example, MPEG-2, or the like. Then a first client device, such as client device 1 of FIG. 1 might receive frame 1 of M.mp2 (MF1) and then perform a first iteration for frame 1 using an HCC MHCi(1.1). Client device 1 may then render MF1 and further compute iteration 2 of MHCi1.1 to produce MHCi1.2 using the HCC.

Client device 1 may then transmit MHCi(1.2) to the peer client devices and/or SEC server 106 where further iterations (e.g. MHCi1.3) might be computed and once again transmitted to the peers or SEC server 106. If MHCi1.3 is considered to satisfy the GET for that frame then client device N+1 would be served HCC encoded movie frame 1 (MHCF1) in place of MF1. If MHCi1.3 satisfies the GCT then client device N+1 will repeat the process of client device 1 except with MF2. If MF1.3 does not satisfy the GCT, then client device N+1 will perform further iterations against MHCi1.3 while rendering MF2.

In one embodiment, client device 1 may be transmitted a Movie that includes Combination Frames (whether represented as a BHCC, and a LCC based frame that encodes the "error" between the BHCC frame and the original BVE frame, or represented as a single frame with both HCC and LCC based equations).

Alternative embodiments may also be performed within systems 100 and/or 400. For example, it is recognized that the HCC based encoding mechanisms may provide less than desirable handling of scene transitions. Thus, in one embodiment, a hint encoding operation may be performed. That is, a BVE of the source video may be made at a central location, such as SEC server 106, or the like. Either simultaneously, or later, a baseline HCC encoding (BHCC) of the same source video is performed. It is noted that LCC based encodings such as those of the BVE may be more deterministic in ways that make scene transitioning easier to detect. For example, in LCC based encodings the motion vectors at scene transitions show wide variations when the scene transition is in a non-intra frame (a P or B frame). Therefore, in one embodiment the hint-encoding scheme provides selected I-frames that are chosen to correspond to the same frame as I-frames in the BVE and/or non-intraframes that show high degrees of change as indicated by the motion vectors.

FIG. 5 illustrates a logical flow diagram generally showing one embodiment of an overview process for progressively encoding a plurality of video frames using the swarm environment. As noted, process 500 of FIG. 5 may be deployed within SEC server 106 of FIGS. 1 and 4, and/or client devices 101-104 (of client devices of FIG. 4).

In any event, process 500 begins, after a start block, at block 505, where video content frames$_{A...N}$ are distributed to each of viewers$_{A...m}$ (herein also termed client devices) for purposes of both decoding and possibly progressive encoding. It will be appreciated that for purposes of viewing the video sequence, each of viewers$_{A...M}$ may receive a complete set of decodable frames. However, in one embodiment, at least one viewer might not receive any frames to be improved by that reviewer. However, in one embodiment, the assignments to viewers to improve a frame are expected to probabilistically result in improvement of all the frames of the video over time. It should be noted, that while the process is described based on viewers, the invention is not so constrained. Thus, in another embodiment, video content may be provided to client devices that might include at least one non-viewer of the video content.

Processing then flows to block 510. It will also be appreciated that the number of viewers and the business value of the video may impact the algorithm for selecting the viewer(s) that will attempt to improve any particular frame. In many situations, a simple random assignment (by either a coordinating entity, such as SEC server 106 of FIG. 1, or the peers themselves) may be used to implement and result in a least communications overhead for coordinating the improvements. In certain situations, e.g. a live broadcast of a Yankees game to viewers in New York might warrant a more sophisticated assignment algorithm that takes into account the expected statistical distribution with which viewers will tune in as well as the acceptable latency from the actual live event. In any event, at block 510, the viewers either selects a frame, or is instructed which frame to select for improvement, if any. Processing flows next to block 520.

At block 520, each viewer$_i$ assigned to improve a frame, applies an HCC to Frame$_j$ for which it is assigned.

Continuing to decision block 525, a determination is made whether improvements are made to the frame as can be judged by a smaller error frame and taking into account improvements made by other viewers—if the viewer has made a best improvement as defined above in block 520, then processing flows to block 530 to announce those improvements to the coordinator and/or the peers. Otherwise, processing flows to block 540.

At block 530, the viewer announces improvements to coordinator and/or peers. In one embodiment, the coordinator may in turn provide the improvements to the peers. Announcements need not include the same information nor be shared equally with all peers/coordinators. In situations where speed (low communications overhead) is desirable the announcements may preferably include, in one embodiment, summary information about a quality of the improvements with the actual details of the improvements transmitted on a selective/as-needed basis. Processing then flows to block 560.

At block 540, if no improvements have been made then announce to the coordinator and/or peers that information regarding any failed paths is available for consideration in subsequent calculations. Processing then flows to block 570, where the peers may consider that information in their subsequent calculations.

At block 560, a determination is made whether improvements made satisfy the GCT or whether the threshold for no more processing on that frame has been reached. Processing then flows to block 570.

At block 570, information from blocks 530, 540, and 560 is considered to feedback into the selection process at block 510 and/or its downstream calculations at block 520, or later. Frames that satisfy the GCT or for which the maximum iterations have been taken are taken out of the selection process at block 520. If "bad path" information is taken into account, redundant calculations can be avoided that might result in the same iteration parameters being run. For some applications where speed and bandwidth are at a premium but video quality is less important, in one embodiment, then at block 540 the sharing of "bad path" information may be omitted, at least partially (between peers), or completely (between peers and or any central coordinator) to avoid the resultant communications overhead. In any event, processing then loops back to block 510 to continue iterations as appropriate to continue to improve one or more frame encoding.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
a transceiver to send and receive data over a network; and
a processor that is operative on the received data to perform actions, including:
distributing a plurality of frames within a video content to a plurality of different peer-to-peer configured client devices, wherein each client device within the plurality is configured to select or be instructed to select at least one frame from the plurality of frames, and to perform at least one iteration of a Progressive High Cost and Compression Encoding Scheme (HCC) encoding upon the selected at least one frame;
receiving at least one resulting output frame from a client device within the plurality of client devices, the at least one resulting output frame generated by the client device performing at least one iteration of the Progressive HCC encoding on the at least one selected frame, the client device applying a set of parameters to the at least one selected frame, wherein the set of parameters is based at least in part on bad path information;
if the received at least one resulting output frame indicates that a global convergence threshold is unsatisfied for the resulting output frame of the iteration on the selected frame, then sending the resulting output frame to another one of the peer-to-peer configured client devices to perform at least one iteration of the Progressive HCC encoding upon the resulting output frame, wherein an indication that a global convergence threshold is unsatisfied is based at least in part on determining a distance between the at least one resulting output frame and the at least one selected frame; and
if the received at least one resulting output frame indicates that the global convergence threshold is satisfied for the resulting output frame, sending the resulting output frame to each of the other peer-to-peer configured client devices to replace the corresponding selected frame in at least a partially encoded form of the video content.

2. A method of performing compression of video content in a distributed computing environment, the method comprising:
transmitting, to each of a plurality of peer-to-peer configured client computing devices, a block including at least one frame within a video content;
receiving, at a network device, blocks from each of the plurality of peer-to-peer configured client computing devices, the blocks being generated by performing an iterative compression process on the at least one frame by each of the plurality of peer-to-peer configured client computing devices, each of the plurality of peer-to-peer configured client computing devices applying a different set of parameters to the at least one frame, wherein the set of parameters applied by each of the plurality of peer-to-peer configured client computing devices is based at least in part on bad path information; and
analyzing, at the network device, the received blocks from each of the plurality of peer-to-peer configured client computing devices to determine whether each of the received blocks is to be selected for use as a resulting output frame in at least a partially encoded form of the video content, wherein analyzing the received blocks includes determining a distance between the resulting output frame and the at least one frame.

3. The method of claim 2, wherein the iterative compression process comprises a Progressive High Cost and Compression Encoding Scheme (HCC) encoding.

4. A system, comprising:
a network device comprising:
a transceiver to send and receive data over a network; and
a processor that is operative on the received data to perform actions, including:
transmitting, to each of a plurality of peer-to-peer configured client computing devices, a block including at least one frame within a video content;
receiving a block generated by performing at least one iteration of an iterative compression process from each of the plurality of peer-to-peer configured client computing devices; and
analyzing each of the received blocks reflecting the iterative compression process to determine whether each of the received blocks is to be selected for use as a resulting output frame in at least a partially encoded form of the video content.

5. The system of claim 4, wherein analyzing a block of the received blocks includes determining a distance between the resulting output frame and the at least one frame.

6. The system of claim 4, wherein the iterative compression process comprises a Progressive High Cost and Compression Encoding Scheme (HCC) encoding.

7. The system of claim 4, wherein each of the plurality of peer-to-peer configured client computing devices applies a set of iteration parameters based at least in part on bad path information.

8. The system of claim 4, further comprising a plurality of different peer-to-peer configured client devices configured to perform at least one iteration of the iterative compression process upon the block as received from the network device.

9. The system of claim 4, wherein analyzing a block of the received blocks includes determining whether a resulting output frame of the iterative compression process on the block satisfies a global convergence threshold.

* * * * *